(12) United States Patent
Kan et al.

(10) Patent No.: US 9,825,661 B2
(45) Date of Patent: *Nov. 21, 2017

(54) MULTI-USER SATELLITE RECEIVING SYSTEM AND METHOD THEREOF

(71) Applicant: Rafael Microelectronics, Inc., Hsinchu County (TW)

(72) Inventors: Meng-Ping Kan, Hsinchu (TW); Hao-Yun Tang, Taipei (TW)

(73) Assignee: RAFAEL MICROELECTRONICS, INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,816

(22) Filed: Dec. 5, 2016

(65) Prior Publication Data

US 2017/0085282 A1   Mar. 23, 2017

Related U.S. Application Data

(63) Continuation of application No. 14/243,904, filed on Apr. 3, 2014, now Pat. No. 9,548,779.

(51) Int. Cl.
*H04H 20/74* (2008.01)
*H04B 1/26* (2006.01)
(Continued)

(52) U.S. Cl.
CPC .................. *H04B 1/28* (2013.01); *H04B 1/10* (2013.01); *H04B 7/14* (2013.01);
(Continued)

(58) Field of Classification Search
CPC .. H03D 7/1458; H03D 7/1483; H03D 7/1466; H04B 1/30; H04B 1/40; H04B 7/18513
(Continued)

(56) References Cited

U.S. PATENT DOCUMENTS 6,337,976 B1 *  1/2002  Kudou ................. H04B 1/30
                                                          455/165.1
6,433,630 B1 *  8/2002  Isoda ................. H03D 3/007
                                                          329/306

(Continued)

*Primary Examiner* — Simon Nguyen
(74) *Attorney, Agent, or Firm* — Min-Lee Teng; Litron Patent & Trademark Office (57) ABSTRACT

An integrated multi-user satellite receiver includes: a single-chip, and the single-chip includes: a first synthesizer for generating a first oscillating signal having a first frequency; a first frequency multiplier for generating a second oscillating signal having a second frequency according to the first oscillating signal; a second synthesizer for generating a third oscillating signal having a third frequency; and a second frequency multiplier for generating a fourth oscillating signal having a fourth frequency according to the third oscillating signal; wherein the single-chip generates a first down-converted signal according to a first satellite signal and the second oscillating signal, generates a second down-converted signal according to the first satellite signal and the fourth oscillating signal, generates a third down-converted signal according to a second satellite signal and the second oscillating signal, and generates a fourth down-converted signal according to the second satellite signal and the fourth oscillating signal.

16 Claims, 6 Drawing Sheets

(51) Int. Cl.
 *H04B 15/00*   (2006.01)
 *H04B 1/28*    (2006.01)
 *H04B 1/10*    (2006.01)
 *H04B 7/14*    (2006.01)
 *H04N 21/40*   (2011.01)
 *H04N 21/61*   (2011.01)

(52) U.S. Cl.
 CPC ........ *H04B 2215/065* (2013.01); *H04N 21/40* (2013.01); *H04N 21/6143* (2013.01)

(58) Field of Classification Search
 USPC ....... 455/3.02, 260, 313, 315, 318, 323, 333
 See application file for complete search history.

(56) References Cited

U.S. PATENT DOCUMENTS

| | | | |
|---|---|---|---|
| 7,171,182 B2 * | 1/2007 | Filipovic | H03B 21/01 |
| | | | 331/34 |
| 7,308,230 B2 * | 12/2007 | Godwin | H04B 7/18513 |
| | | | 342/354 |
| 8,805,309 B2 * | 8/2014 | Leenaerts | H03D 7/163 |
| | | | 455/132 |
| 2003/0156668 A1 * | 8/2003 | Atkinson | B01F 5/246 |
| | | | 375/345 |
| 2014/0065985 A1 * | 3/2014 | Weissman | H04B 1/40 |
| | | | 455/86 |

* cited by examiner

MULTI-USER SATELLITE RECEIVING SYSTEM AND METHOD THEREOF

BACKGROUND OF THE INVENTION

1. Field of the Invention

The present invention relates to a multi-user satellite receiving system and a method for receiving satellite signals, and more particularly to a low cost LNB (low-noise block) and method thereof.

2. Description of the Prior Art

In the field of satellite TV system, the signals received by a dish antenna are transferred to a frequency converter called LNB (Low Noise Block converter). The LNB converts the incoming signal to a lower frequency in the area between 950 and 2150 MHz, and then amplifies the signal before it is sent to a satellite tuner. However, one satellite tuner may no longer satisfy the requirement of a household because a variety of different TV appliances may need to receive different TV programs simultaneously in different rooms in one household. Therefore, the trend is to provide a LNB having the capability of providing multiple outputs to multiple tuners such that the reception of any channel from any path on the multiple tuners in different receive appliances simultaneously and independently. However, the cost of the conventional LNB is too high because of the costs of discrete components installed therein. Therefore, providing a low cost LNB is becoming an urgent problem in the field of satellite TV system.

SUMMARY OF THE INVENTION

One of the objectives of the present invention is to provide a low cost multi-user LNB (low-noise block) for receiving satellite signals and a method thereof.

According to a first embodiment of the present invention, an integrated multi-user satellite receiver is provided. The integrated multi-user satellite receiver includes a single-chip. The single-chip comprises a first synthesizer, a first frequency multiplier, a second synthesizer, and a second frequency multiplier. The first synthesizer is arranged to generate a first oscillating signal having a first frequency. The first frequency multiplier is coupled to the first synthesizer, for generating a second oscillating signal having a second frequency according to the first oscillating signal. The second synthesizer is arranged to generate a third oscillating signal having a third frequency. The second frequency multiplier is coupled to the second synthesizer for generating a fourth oscillating signal having a fourth frequency according to the third oscillating signal. The single-chip generates a first down-converted signal according to a first satellite signal and the second oscillating signal, generates a second down-converted signal according to the first satellite signal and the fourth oscillating signal, generates a third down-converted signal according to a second satellite signal and the second oscillating signal, and generates a fourth down-converted signal according to the second satellite signal and the fourth oscillating signal.

According to a second embodiment of the present invention, a method for receiving satellite signals is provided. The method comprises: generating a first oscillating signal having a first frequency; generating a second oscillating signal having a second frequency according to the first oscillating signal; generating a third oscillating signal having a third frequency; generating a fourth oscillating signal having a fourth frequency according to the third oscillating signal; generating a first down-converted signal according to a first satellite signal and the second oscillating signal; generating a second down-converted signal according to the first satellite signal and the fourth oscillating signal; generating a third down-converted signal according to a second satellite signal and the second oscillating signal; and generating a fourth down-converted signal according to the second satellite signal and the fourth oscillating signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
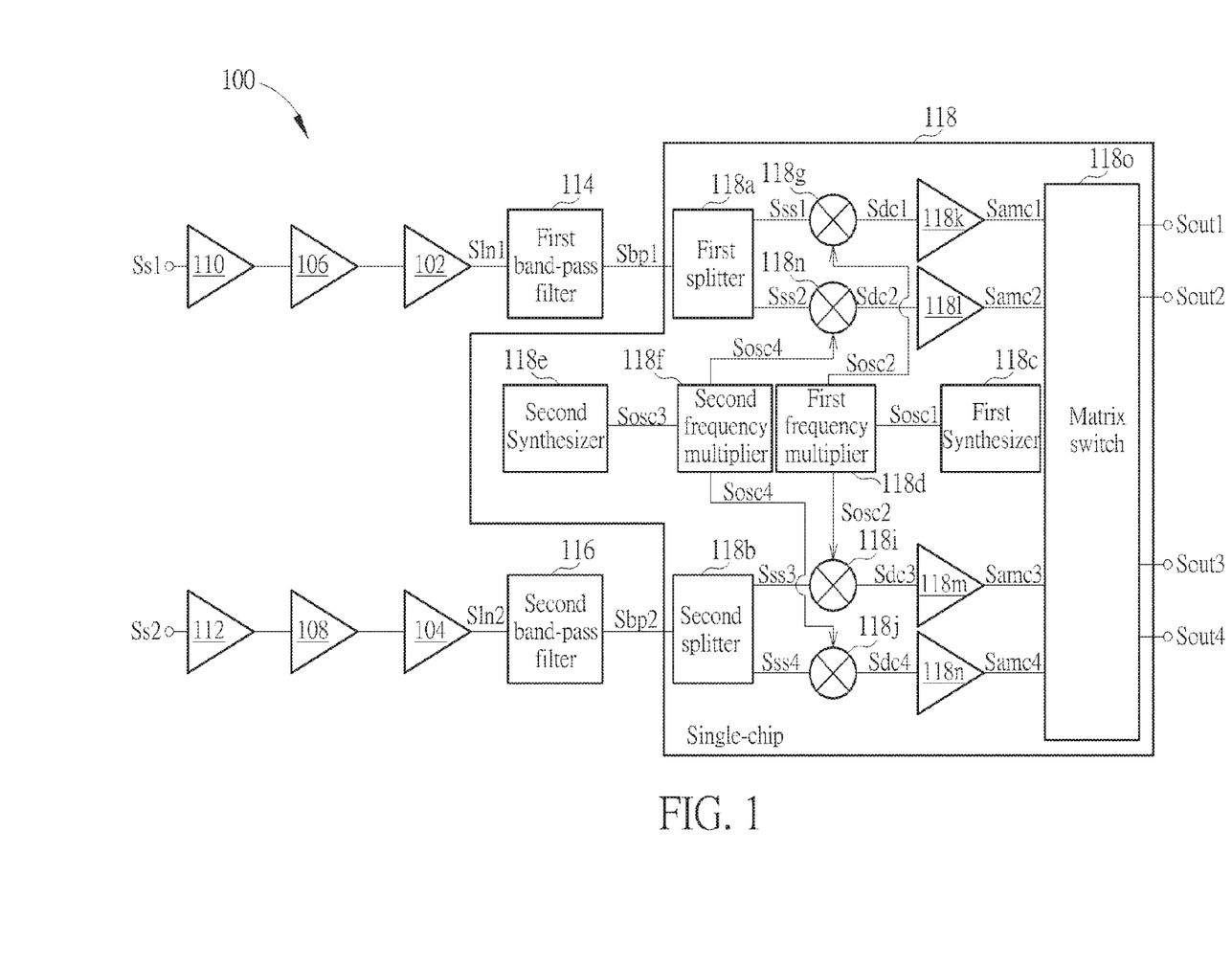
FIG. 1 is a diagram illustrating a multi-user satellite receiving system according to a first embodiment of the present invention.

Please refer to FIG. 1, which is a diagram illustrating a multi-user satellite receiving system 100 for receiving satellite signals Ss1, Ss2 according to a first embodiment of the present invention. The multi-user satellite receiving system 100 may be an integrated multi-user satellite receiver. The satellite signals Ss1, Ss2 may be a horizontal polarized signal and a vertical polarized signal (H and V) respectively, or a left-hand circular polarized signal and a right-hand circular polarized signal (LH and RH) received from one or two dish antennas. The multi-user satellite receiving system 100 may be a low-noise block (LNB) used to convert the satellite signals Ss1, Ss2 to a lower frequency in the area between 950 and 2150 MHz, and then amplifies the signal before it is sent to a satellite tuner. The multi-user satellite receiving system 100 can be a Quad LNB or a Twin LNB. The multi-user satellite receiving system 100 comprises a first three stage low-noise amplifier (LNA) comprising LNAs 102, 106, 110, a second three stage LNA comprising LNAs 104, 108, 112, a first band-pass filter (BPF) 114, a second BPF 116, and a single-chip 110. The LNA 102, 106, 110 are arranged to generate a first low-noise signal Sln1 according to the first satellite signal Ss1. The LNA 104, 108, 112 are arranged to generate a second low-noise signal Sln2 according to the second satellite signal Ss2. These LNAs are used to make the Noise Figure of the whole LNB system to lower than 1 dB, and these LNAs are usually realized by SiGe component which are used to generate ultra-low noise signal for the following stages.

The first BPF 114 is coupled to the LNA 102 for generating a first band-pass signal Sbp11 according to the first low-noise signal Sln1. The second BPF 116 is coupled to the LNA 104 for generating a second band-pass signal Sbp2 according to the second low-noise signal Sln2.

The single-chip 118 is coupled to the first BPF 114 and the second BPF 116 for outputting a first output signal Sout1, a second output signal Sout2, a third output signal Sout3, and a fourth output signal Sout4 according to the first band-pass signal Sbp1 and the second band-pass signal Sbp2, wherein each of the first output signal Sout1, the second low-noise signal Sln2, the third output signal Sout3, and the fourth output signal Sout4 comprises information of the first band-pass signal Sbp1 and the second band-pass signal Sbp2. In this embodiment, the frequency range of the satellite signals Ss1, Ss2 is in the KU-band, i.e. 10.7 GHz-12.75 GHz. The frequency range of the output signals Sout1, Sout2, Sout3, Sout4 is 950 MHz-2150 MHz. However, this is not a limitation of the present invention.

The single-chip 118 comprises a first splitter 118a, a second splitter 118b, a first synthesizer 118c, a first frequency multiplier 118d, a second synthesizer 118e, a second frequency multiplier 118f, a first mixer 118g, a second mixer 118h, a third mixer 118i, a fourth mixer 118j, a first amplifier 118k, a second amplifier 118l, a third amplifier 118m, a fourth amplifier 118n, and a matrix switch 1180.

The first splitter 118a is coupled to the first BPF 114 for splitting the first band-pass signal Sbp1 into a first splitting signal Sss1 and a second splitting signal Sss2. The second splitter 118b is coupled to the second BPF 116 for splitting the second band-pass signal Sbp2 into a third splitting signal Sss3 and a fourth splitting signal Sss4. The first synthesizer 118c is arranged to generate a first oscillating signal Sosc1 having a first frequency F1. The first frequency multiplier 118d is coupled to the first synthesizer 118c for generating a second oscillating signal Sosc2 having a second frequency F2 according to the first oscillating signal Sosc1, wherein the second oscillating signal Sosc2 is the M-th harmonic frequency signal, which is also notated as Sosc2 hereinafter, having M times frequency value to the first frequency F1. The second synthesizer 118e is arranged to generate a third oscillating signal Sosc3 having a third frequency F3. The second frequency multiplier 118f is coupled to the second synthesizer 118e for generating a fourth oscillating signal Sosc4 having a fourth frequency F4 according to the third oscillating signal Sosc3, wherein the fourth oscillating signal Sosc4 is the N-th harmonic frequency signal, which is also notated as Sosc4 hereinafter, having N times frequency value to the third frequency F3. The first frequency F1 is different from the third frequency F3, thus the second frequency F2 is also different from the fourth frequency F4.

The first mixer 118g is coupled to the first splitter 118a for generating a first down-converted signal Sdc1 according to the first splitting signal Sss1 and the M-th harmonic frequency signal Sosc2. The second mixer 118h is coupled to the first splitter 118a for generating a second down-converted signal Sdc2 according to the second splitting signal Sss2 and the N-th harmonic frequency signal Sosc4. The third mixer 118i is coupled to the second splitter 118b for generating a third down-converted signal Sdc3 according to the third splitting signal Sss3 and the M-th harmonic frequency signal Sosc2. The fourth mixer 118j is coupled to the second splitter 118b for generating a fourth down-converted signal Sdc4 according to the fourth splitting signal Sss4 and the N-th harmonic frequency signal Sosc4.

The first amplifier 118k is coupled to the first mixer 118g for amplifying the first down-converted signal Sdc1 to generate a first amplified down-converted signal Samc1. The second amplifier 118l is coupled to the second mixer 118h for amplifying the second down-converted signal Sdc2 to generate a second amplified down-converted signal Samc2. The third amplifier 118m is coupled to the third mixer 118i for amplifying the third down-converted signal Sdc3 to generate a third amplified down-converted signal Samc3. The fourth amplifier 118n is coupled to the fourth mixer 118j for amplifying the fourth down-converted signal Sdc4 to generate a fourth amplified down-converted signal Samc4.

The matrix switch 118o is coupled to the first amplifier 118k, the second amplifier 118l, the third amplifier 118m, and the fourth amplifier 118n, for generating the first output signal Sout1, the second output signal Sout2, the third output signal Sout3, and the fourth output signal Sout4 according to the first amplified down-converted signal Samc1, the second amplified down-converted signal Samc2, the third amplified down-converted signal Samc3, and the fourth amplified down-converted signal Samc4.

In the embodiment as shown in FIG. 1, the LNAs 102, 104, 106, 108, 110, 112, the BPF 114, and the second BPF 116 are externally coupled to the single-chip 118 because the single-chip 118 is implemented as a system-on-chip. Therefore, the cost of the receiving system multi-user satellite receiving system 100 for receiving satellite signals Ss1, Ss2 can be reduced. To implement the single-chip 118 as a system-on-chip, the first synthesizer 118c is first arranged to generate the first oscillating signal Sosc1 having the first frequency F1, then the first frequency multiplier 118d is arranged to multiply the first oscillating signal Sosc1 by a number M to generate the M-th harmonic frequency signal Sosc2 having the second frequency F2. Similarly, the second synthesizer 118e is first arranged to generate the third oscillating signal Sosc3 having the third frequency F3, and then the second frequency multiplier 118f is arranged to multiply the third oscillating signal Sosc3 by a number N to generate the N-th harmonic frequency signal Sosc4 having the fourth frequency F4.

Figure 2:
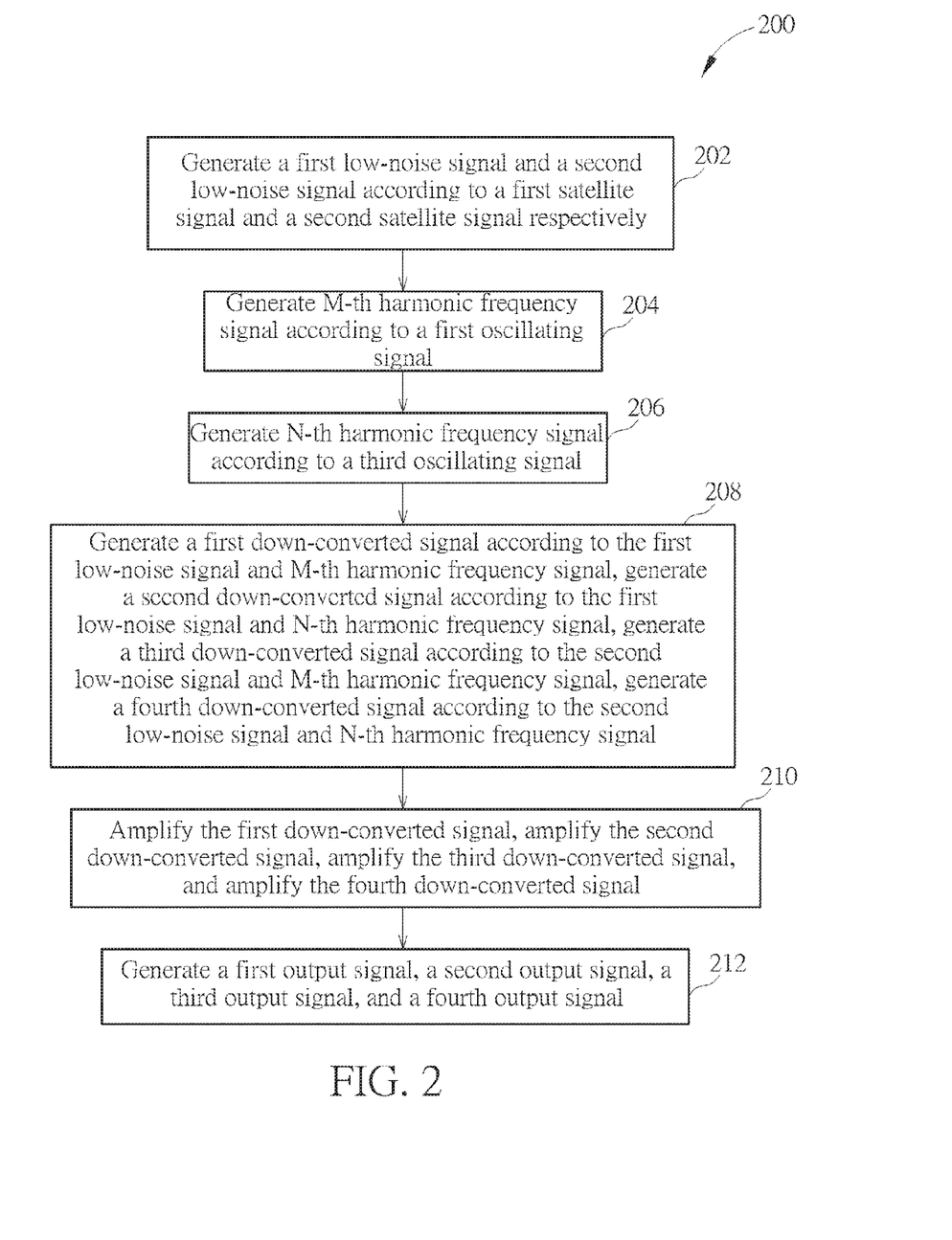
FIG. 2 is a flowchart illustrating a method for receiving satellite signals according to a second embodiment of the present invention.

The operation of the above multi-user satellite receiving system 100 can be summarized into the steps as shown in FIG. 2. FIG. 2 is a flowchart illustrating a method 200 for receiving satellite signals according to a second embodiment of the present invention. Provided that substantially the same result is achieved, the steps of the flowchart shown in FIG. 2 need not be in the exact order shown and need not be contiguous, that is, other steps can be intermediate. The method 200 comprises:

Step 202: Generate the first low-noise signal Sln1 and the second low-noise signal Sln2 according to the first satellite signal Ss1 and the second satellite signal Ss2 respectively;

Step 204: Generate the first oscillating signal Sosc1 having the first frequency F1 and generates the M-th harmonic frequency signal Sosc2 having M times frequency value to the first frequency F1 according to the first oscillating signal Sosc1;

Step 206: Generate the third oscillating signal Sosc3 having the third frequency F3 and generate the N-th harmonic frequency signal Sosc4 having N times frequency value to the third frequency F3;

Step 208: Generate the first down-converted signal Sdc1 according to the first low-noise signal Sln1 and the M-th harmonic frequency signal Sosc2, generate the second down-converted signal Sdc2 according to the first low-noise signal Sln1 and the N-th harmonic frequency signal Sosc4, generate the third down-converted signal Sdc3 according to the second low-noise signal Sln2 and the M-th harmonic frequency signal Sosc2, generate the fourth down-converted signal Sdc4 according to the second low-noise signal Sln2 and the N-th harmonic frequency signal Sosc4;

Step 210: Amplify the first down-converted signal Sdc1 to generate the first amplified down-converted signal Samc1, amplify the second down-converted signal Sdc2 to generate the second amplified down-converted signal Samc2, amplify the third down-converted signal Sdc3 to generate the third amplified down-converted signal Samc3, and amplify the fourth down-converted signal Sdc4 to generate the fourth amplified down-converted signal Samc4; and Step 212: Generate the first output signal Sout1, the second output signal Sout2, the third output signal Sout3, and the fourth output signal Sout4 according to the first amplified down-converted signal Samc1, the second amplified down-converted signal Samc2, the third amplified down-converted signal Samc3, and the fourth amplified down-converted signal Samc4.

Figure 3:
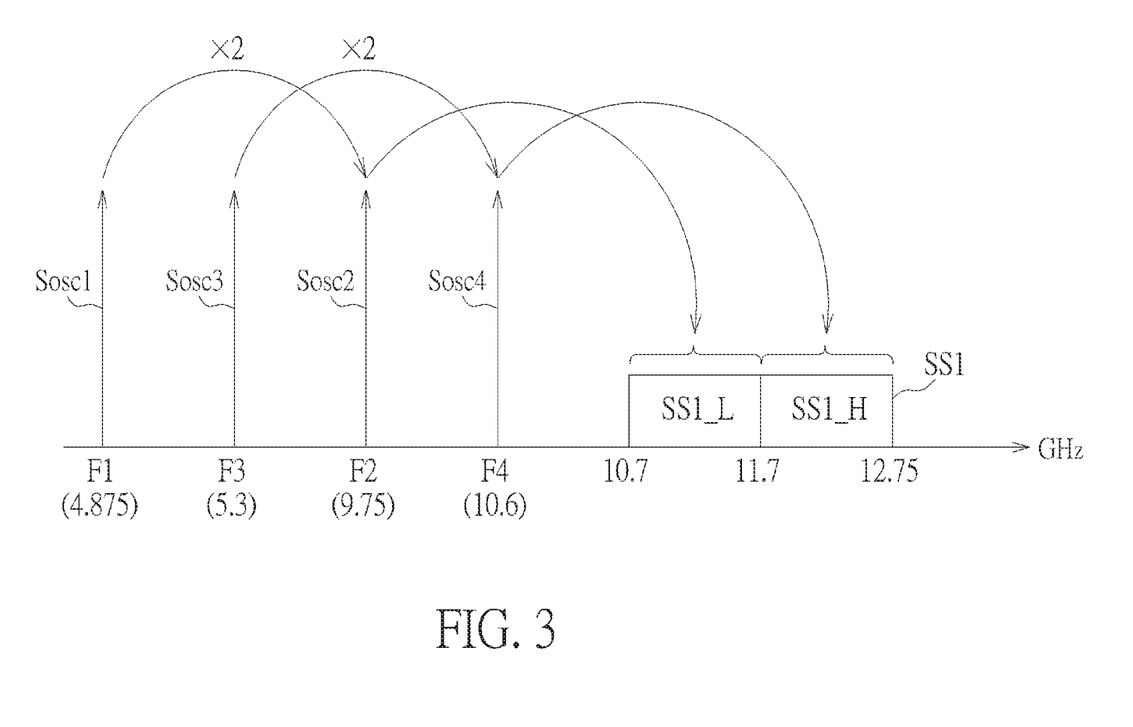
FIG. 3 is a spectrum diagram illustrating a first oscillating signal, a second oscillating signal, a third oscillating signal, a fourth oscillating signal, and a satellite signal according to an embodiment of the present invention.

Please refer to FIG. 2 in conjunction with FIG. 3, in which FIG. 3 is a spectrum diagram illustrating the first oscillating signal Sosc1, the M-th harmonic frequency signal Sosc2, the third oscillating signal Sosc3, the N-th harmonic frequency signal Sosc4, and the satellite signal Ss1 according to an embodiment of the present invention, wherein the satellite signal Ss1 is the vertical signal that comprises a vertical-low signal SS1_L and a vertical-high signal SS1_H, the frequency band of the vertical-low signal SS1_L is from 10.7 GHz to 11.7 GHz, and the frequency band of the vertical-high signal SS1_H is from 11.7 GHz to 12.75 GHz. In this embodiment, the N-th harmonic frequency signal Sosc4 received by the second mixer 118$h$ is arranged to have frequency (i.e. the second frequency F4) higher than the frequency (i.e. the second frequency F2) of the M-th harmonic frequency signal Sosc2 received by the first mixer 118$g$. For example, the fourth frequency F4 is 10.6 GHz and the second frequency F2 is 9.75 GHz. Then, the first synthesizer 118$c$ is arranged to generate the first oscillating signal Sosc1 having the first frequency F1 of 4.875 GHz, i.e. a half frequency of the second frequency F2. The second synthesizer 118$e$ is arranged to generate the third oscillating signal Sosc3 having the third frequency F3 of 5.3 GHz, i.e. a half frequency of the fourth frequency F4. In other words, the number M multiplied by the first frequency multiplier 118$d$ is 2, and the number N multiplied by the second frequency multiplier 118$f$ is also 2. Therefore, Sosc2 is the $2^{nd}$ harmonic frequency signal of the first oscillating signal Sosc1, and Sosc4 is also the $2^{nd}$ harmonic frequency signal of the third oscillating signal Sosc3 in this embodiment. It is noted that the numbers M and N are adjustable, and the numbers M and N can be any number larger than zero depending on the design choice.

Figure 4:
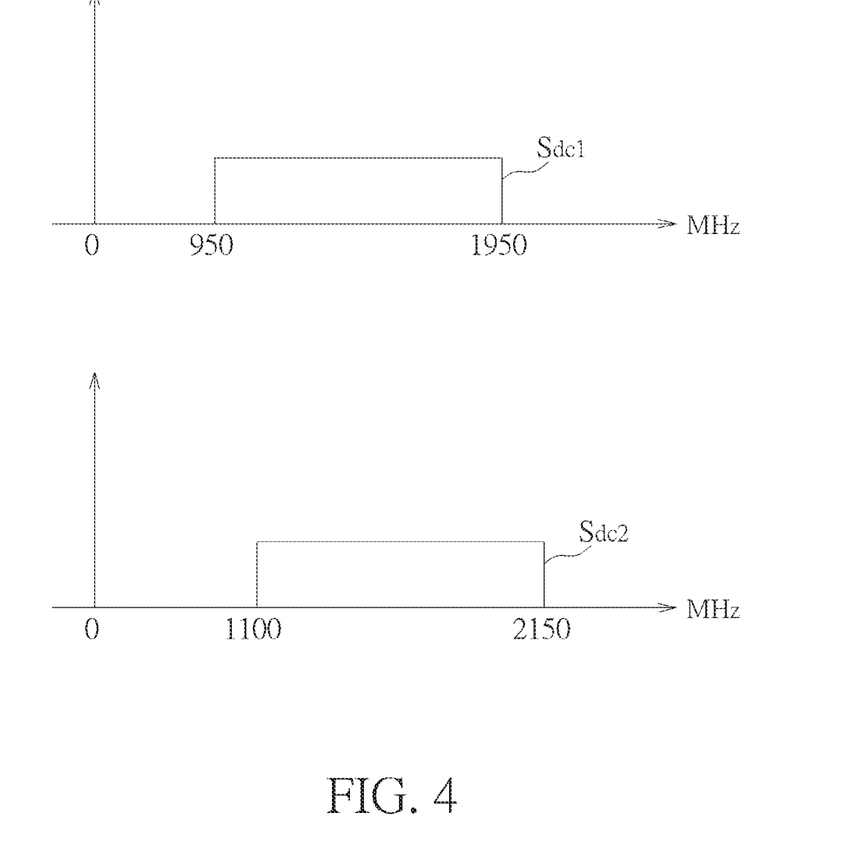
FIG. 4 is a spectrum diagram illustrating a first down-converted signal and a second down-converted signal according to an embodiment of the present invention.

The M-th harmonic frequency signal Sosc2 is arranged to down-convert the vertical-low signal SS1_L of the satellite signal Ss1 to generate the first down-converted signal Sdc1, and the N-th harmonic frequency signal Sosc4 is arranged to down-convert the vertical-high signal SS1_L of the satellite signal Ss1 to generate the second down-converted signal Sdc2. Please refer to FIG. 4, which is a spectrum diagram illustrating the down-converted signals Sdc1-Sdc2 according to an embodiment of the present invention, wherein the bandwidth of the first down-converted signal Sdc1 is from the frequency 950 MHz to 1950 MHz, and the bandwidth of the second down-converted signal Sdc2 is from the frequency 1100 MHz to 2150 MHz.

Figure 5:
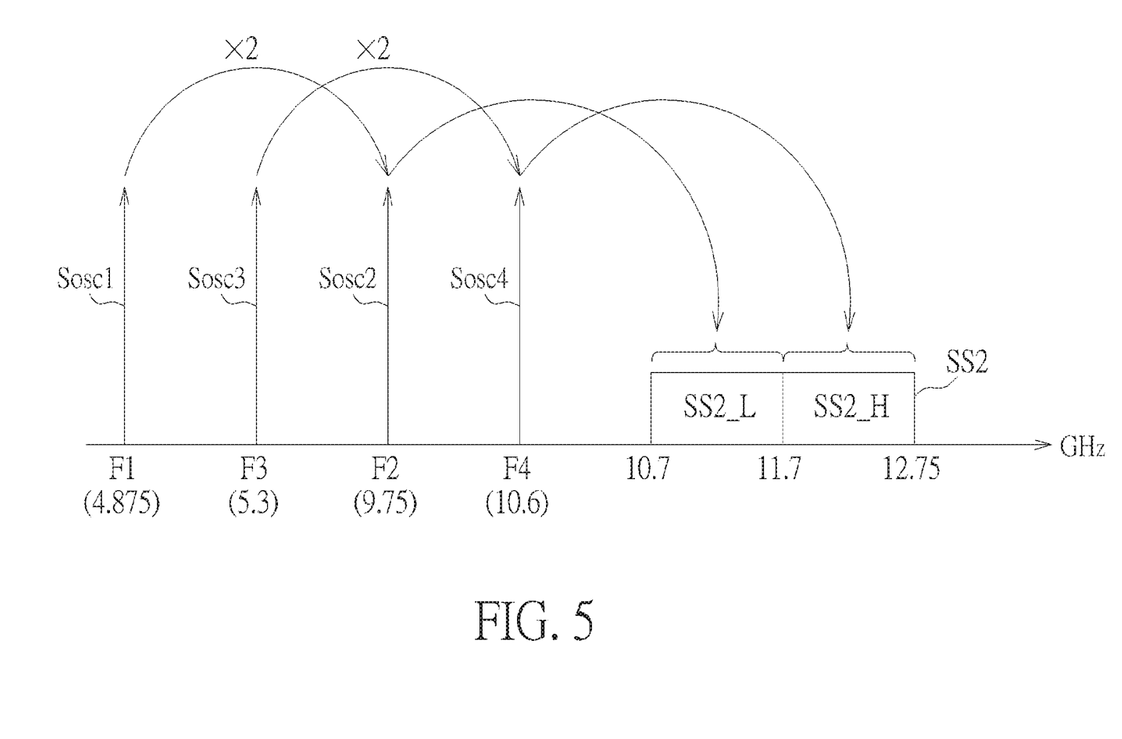
FIG. 5 is a spectrum diagram illustrating the first oscillating signal, the second oscillating signal, the third oscillating signal, the fourth oscillating signal, and a satellite signal according to an embodiment of the present invention.

On the other hand, please refer to FIG. 5, which is a spectrum diagram illustrating the first oscillating signal Sosc1, the M-th harmonic frequency signal Sosc2, the third oscillating signal Sosc3, the N-th harmonic frequency signal Sosc4, and the satellite signal Ss2 according to an embodiment of the present invention, wherein the satellite signal Ss2 is the horizontal signal that comprises a horizontal-low signal SS2_L and a horizontal-high signal SS2_H, the frequency band of the vertical-low signal SS2_L is from 10.7 GHz to 11.7 GHz, and the frequency band of the vertical-high signal SS2_H is from 11.7 GHz to 12.75 GHz. In this embodiment, the N-th harmonic frequency signal Sosc4 received by the fourth mixer 118$j$ is arranged to have frequency (i.e. the second frequency F4) higher than the frequency (i.e. the second frequency F2) of the M-th harmonic frequency signal Sosc2 received by the third mixer 118$i$. Similarly, the fourth frequency F4 is 10.6 GHz and the second frequency F2 is 9.75 GHz. The first synthesizer 118$c$ is arranged to generate the first oscillating signal Sosc1 having the first frequency F1 of 4.875 GHz, i.e. a half frequency of the second frequency F2. The second synthesizer 118$e$ is arranged to generate the third oscillating signal Sosc3 having the third frequency F3 of 5.3 GHz, i.e. a half frequency of the fourth frequency F4.

Figure 6:
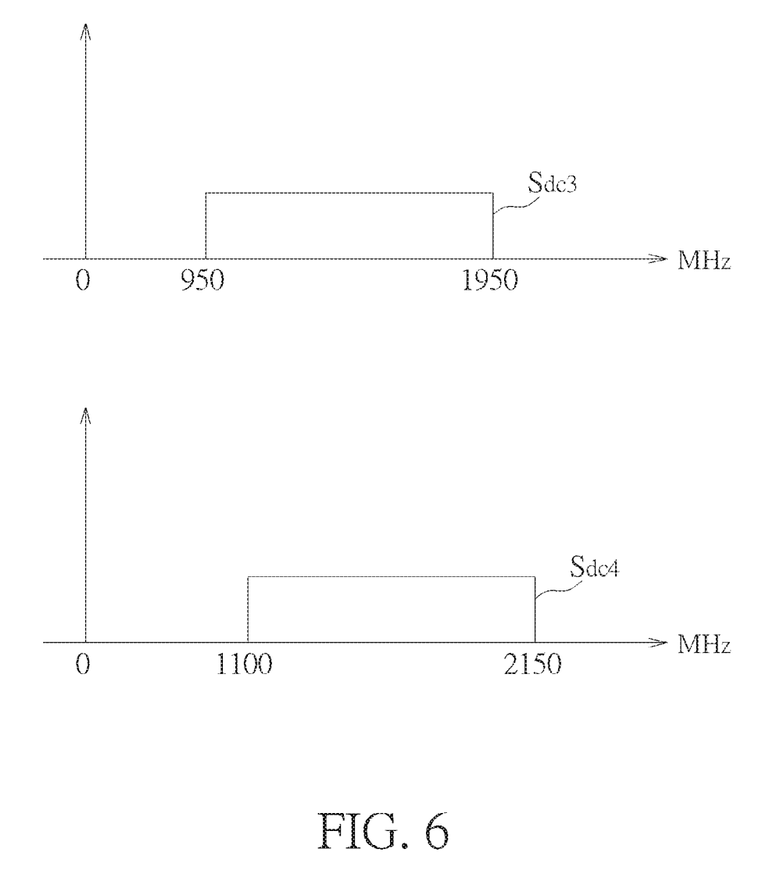
FIG. 6 is a spectrum diagram illustrating a third down-converted signal and a fourth down-converted signal according to an embodiment of the present invention.

The M-th harmonic frequency signal Sosc2 is arranged to down-convert the horizontal-low signal SS2_L of the satellite signal Ss2 to generate the third down-converted signal Sdc3, and the N-th harmonic frequency signal Sosc4 is arranged to down-convert the horizontal-high signal SS2_H of the satellite signal Ss2 to generate the fourth down-converted signal Sdc4. Please refer to FIG. 6, which is a spectrum diagram illustrating the down-converted signals Sdc3-Sdc4 according to an embodiment of the present invention, wherein the bandwidth of the third down-converted signal Sdc3 is from the frequency 950 MHz to 1950 MHz, and the bandwidth of the fourth down-converted signal Sdc4 is from the frequency 1100 MHz to 2150 MHz.

It is noted that if the first synthesizer 118$c$ and the second synthesizer 118$e$ are utilized to directly generate two oscillating signals having 9.75 GHz and 10.6 GHz respectively, i.e. without using the first frequency multiplier 118$d$ and the second frequency multiplier 118$f$, the frequency difference between the frequency of the first synthesizer 118$c$ and the frequency of the second synthesizer 118$e$ is 850 MHz, i.e. 10.6 GHz−9.75 GHz=850 MHz. Then, due to the differential pairs used in the first synthesizer 118$c$ and the second synthesizer 118$e$, the power of the signal at the frequency 1700 MHz (i.e. 2*850=1700 MHz) must be very large. Consequently, the power of this signal will affect the down-converted signals Sdc1, Sdc2, Sdc3, Sdc4 because the frequency of this signal (i.e. 1700 MHz) falls into the frequency band of the down-converted signals Sdc1, Sdc2, Sdc3, Sdc4, i.e. this signal is in the band of the down-converted signals Sdc1, Sdc2, Sdc3, Sdc4.

However, according to the embodiment of the present invention, the frequency difference between the frequency operated by the first synthesizer 118c and the frequency operated by the second synthesizer 118e is 425 MHz, i.e. F1−F3=425 MHz. Then, although the power of the signal at the frequency 850 MHz (i.e. 2*425=850 MHz) is very large, this signal may not affect the down-converted signals Sdc1, Sdc2, Sdc3, Sdc4 because the frequency of this signal (i.e. 850 MHz) is not fall in the frequency band of the down-converted signals Sdc1, Sdc2, Sdc3, Sdc4, i.e. the signal is out-of-band of the down-converted signals Sdc1, Sdc2, Sdc3, Sdc4. Therefore, by doing this, the oscillating signals generated by the first synthesizer 118c and the second synthesizer 118e do not interfere the down-converted signals Sdc1-Sdc4.

Moreover, as the frequencies F1, F3 of the oscillating signals Sosc1, Sosc3 generated by the first synthesizer 118c and the second synthesizer 118e are lower than the required frequencies F2, F4 respectively, the signal paths from the first synthesizer 118c to the first mixer 118g and the third mixer 118i and the signal paths from the second synthesizer 118e to the second mixer 118h and the fourth mixer 118j are easy to design. More specifically, the routing between the first frequency multiplier 118d and the first mixer 118g and the routing between the first frequency multiplier 118d and the third mixer 118i can be designed to have the lengths as short as possible because these routings need to carry the high frequency, i.e. 10.6 GHz, in comparison to the frequency of 5.3 GHz. Similarly, the routing between the second frequency multiplier 118f and the second mixer 118h and the routing between the second frequency multiplier 118f and the fourth mixer 118j can be designed to have the lengths as short as possible because these routings also need to carry the high frequency, i.e. 9.75 GHz, in comparison to the frequency of 4.875 GHz. Accordingly, the signal integrity of the M-th harmonic frequency signal Sosc2 received by the first mixer 118g and the third mixer 118i can be well controlled, and the signal integrity of the N-th harmonic frequency signal Sosc4 received by the second mixer 118h and the fourth mixer 118j can also be well controlled.

It should be noted that the first frequency multiplier 118d and the second frequency multiplier 118f as shown in FIG. 1 are just an exemplary embodiment of the present invention. The first frequency multiplier 118d may comprises two separated frequency multipliers, one is arranged to generate the required oscillating signal to the first mixer 118g, and the other is arranged to generate another required oscillating signal to the third mixer 118i. Similarly, the second frequency multiplier 118f may comprises two separated frequency multipliers, one is arranged to generate the required oscillating signal to the second mixer 118h, and the other is arranged to generate another required oscillating signal to the fourth mixer 118j. Moreover, the oscillating signal received by the first mixer 118g may have different phase from the phase of the oscillating signal received by third mixer 118i (e.g. 90 degree phase difference), and the oscillating signal received by the second mixer 118h may have different phase from the phase of the oscillating signal received by fourth mixer 118j (e.g. 90 degree phase difference).

In addition, in this embodiment, the matrix switch 118o is a 4-to-4 switch, thus there has four output signals (i.e. the first output signal Sout1, the second output signal Sout2, the third output signal Sout1, and the fourth output signal Sout4) generated by the matrix switch 118o in this embodiment. This is not a limitation of the present invention. In another embodiment of the present invention, the matrix switch 118o may be a 4-to-2 switch, thus there may have only two output signals generated by the matrix switch 118o in the embodiment. Those skilled in the art are appreciated to understand the operation of this modified embodiment, thus the detailed description is omitted here for brevity.

It should be noted that although the LNAs 102, 104, 106, 108, 110, 112, the first BPF 114, the second BPF 116 are implemented external to the single-chip 110, this is not a limitation of the present invention.

In one embodiment, the first BPF 114 and the second BPF 116 are implemented into the single-chip 110. Accordingly, the LNAs 102, 104, 106, 108, 110, and 112 are external to the single-chip 110 in this embodiment.

In another embodiment, the first BPF 114, the second BPF 116, the LNAs 102 and 104 are implemented into the single-chip 110. Accordingly, the LNAs 106, 108, 110, and 112 are external to the single-chip 110 in this embodiment.

In another embodiment, the first splitter 118a and the second splitter 118b are not implemented into the single-chip 110. Accordingly, the LNAs 102, 104, 106, 108, 110, 112, the first BPF 114, the second BPF 116, the first splitter 118a, and the second splitter 118b are external to the single-chip 110 in this embodiment.

Briefly, the present invention provides a multi-user satellite receiving system and related method for down-converted the satellite signals and outputting a plurality of down-converted output signals to a plurality of tuners respectively. Accordingly, the cost of a LNB having the single-chip installed therein is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal receiver comprising
   a first synthesizer configured to generate a first oscillating signal having a first frequency;
   a first frequency multiplier coupled to the first synthesizer, wherein the first frequency multiplier is configured to generate a second oscillating signal, having a second frequency greater than the first frequency, according to the first oscillating signal;
   a second synthesizer configured to generate a third oscillating signal having a third frequency;
   a second frequency multiplier coupled to the second synthesizer, wherein the second frequency multiplier is configured to generate a fourth oscillating signal, having a fourth frequency greater than the third frequency, according to the third oscillating signal;
   a first mixer configured to apply the second oscillating signal to a first input signal to be down-converted into a first mixed signal;
   a second mixer configured to apply the fourth oscillating signal to a second input signal to be down-converted into a second mixed signal;
   a third mixer configured to apply the second oscillating signal to a third input signal to be down-converted into a third mixed signal; and
   a fourth mixer configured to apply the fourth oscillating signal to a fourth input signal to be down-converted into a fourth mixed signal, wherein the first and second synthesizers, first and second frequency multipliers and first, second, third and fourth mixers are incorporated in a single chip.

2. The signal receiver of claim 1, wherein the second frequency is substantially twice as high as the first frequency.

3. The signal receiver of claim 1, further comprising a matrix switch arranged downstream of the first, second, third and fourth mixers, wherein the first and second synthesizers, first and second frequency multipliers, first, second, third and fourth mixers and matrix switch are incorporated in a single chip.

4. The signal receiver of claim 3 further comprising:
a first amplifier coupled to the first mixer, wherein the first amplifier is configured to amplify the first mixed signal into a first amplified signal to be coupled to the matrix switch;
a second amplifier coupled to the second mixer, wherein the second amplifier is configured to amplify the second mixed signal into a second amplified signal to be coupled to the matrix switch;
a third amplifier coupled to the third mixer, wherein the third amplifier is configured to amplify the third mixed signal into a third amplified signal to be coupled to the matrix switch; and
a fourth amplifier coupled to the fourth mixer, wherein the fourth amplifier is configured to amplify the fourth mixed signal into a fourth amplified signal to be coupled to the matrix switch, wherein the first, second, third and fourth amplifiers are further incorporated in the single chip.

5. The signal receiver of claim 1, wherein the fourth frequency is higher than the second frequency.

6. The signal receiver of claim 1 further comprising:
a first splitter arranged upstream of the first and second mixers, wherein the first splitter is configured to split a fifth input signal into the first and second input signals; and
a second splitter arranged upstream of the third and fourth mixers, wherein the second splitter is configured to split a sixth input signal into the third and fourth input signals, wherein the first and second splitters are further incorporated in the single chip.

7. The signal receiver of claim 6, wherein the fifth input signal comprises a satellite signal in a horizontal polarization and the sixth input signal comprises the satellite signal in a vertical polarization.

8. The signal receiver of claim 6, wherein the fifth input signal comprises a satellite signal in a left-hand polarization and the sixth input signal comprises the satellite signal in a right-hand polarization.

9. A method for processing signals in a single chip for a signal receiver, comprising:
generating, in the single chip, a first oscillating signal having a first frequency;
generating, in the single chip, a second oscillating signal, having a second frequency greater than the first frequency, according to the first oscillating signal;
generating, in the single chip, a third oscillating signal having a third frequency;
generating, in the single chip, a fourth oscillating signal, having a fourth frequency greater than the third frequency, according to the third oscillating signal;
applying, in the single chip, the second oscillating signal to a first input signal to be down-converted into a first mixed signal;
applying, in the single chip, the fourth oscillating signal to a second input signal to be down-converted into a second mixed signal;
applying, in the single chip, the second oscillating signal to a third input signal to be down-converted into a third mixed signal; and
applying, in the single chip, the fourth oscillating signal to a fourth input signal to be down-converted into a fourth mixed signal.

10. The method of claim 9, wherein the second frequency is substantially twice the first frequency.

11. The method of claim 9, further generating, by a matrix switch in the single chip, multiple output signals according to the first, second, third and fourth mixed signals.

12. The method of claim 11 further comprising:
amplifying, in the single chip, the first mixed signal into a first amplified signal to be coupled to the matrix switch;
amplifying, in the single chip, the second mixed signal into a second amplified signal to be coupled to the matrix switch;
amplifying, in the single chip, the third mixed signal into a third amplified signal to be coupled to the matrix switch; and
amplifying, in the single chip, the fourth mixed signal into a fourth amplified signal to be coupled to the matrix switch.

13. The method of claim 9 further comprising:
splitting, in the single chip, a fifth input signal into the first and second input signals; and
splitting, in the single chip, a sixth input signal into the third and fourth input signals.

14. The method of claim 13, wherein the fifth input signal comprises a satellite signal in a horizontal polarization and the sixth input signal comprises the satellite signal in a vertical polarization.

15. The method of claim 13, wherein the fifth input signal comprises a satellite signal in a left-hand polarization and the sixth input signal comprises the satellite signal in a right-hand polarization.

16. The method of claim 9, wherein the fourth frequency is higher than the second frequency.

* * * * *